(12) United States Patent
Klaiber et al.

(10) Patent No.: US 8,117,421 B2
(45) Date of Patent: Feb. 14, 2012

(54) DATA STRUCTURE FOR ENFORCING CONSISTENT PER-PHYSICAL PAGE CACHEABILITY ATTRIBUTES

(76) Inventors: Alexander C. Klaiber, Mountain View, CA (US); David Dunn, Sammamish, WA (US)

( * ) Notice: Subject to any disclaimer, the term of this patent is extended or adjusted under 35 U.S.C. 154(b) by 0 days.

(21) Appl. No.: 12/688,722

(22) Filed: Jan. 15, 2010

(65) Prior Publication Data

US 2010/0122013 A1 May 13, 2010

Related U.S. Application Data

(62) Division of application No. 11/314,494, filed on Dec. 20, 2005, now Pat. No. 7,676,629, which is a division of application No. 10/623,021, filed on Jul. 17, 2003, now Pat. No. 7,062,631.

(51) Int. Cl.
G06F 12/00 (2006.01)
G06F 13/00 (2006.01)

(52) U.S. Cl. ........ 711/206; 711/100; 711/141; 711/154; 711/200

(58) Field of Classification Search .................. 711/100, 711/117, 118, 141, 146, 154, 200, 205, 206, 711/207
See application file for complete search history.

(56) References Cited

U.S. PATENT DOCUMENTS

| 6,189,074 | B1 | 2/2001 | Pedneau |
| 6,304,944 | B1 | 10/2001 | Pedneau |
| 6,499,123 | B1 | 12/2002 | McFarland et al. |
| 6,738,864 | B2 | 5/2004 | Chauvel |
| 6,779,085 | B2 | 8/2004 | Chauvel |
| 6,839,813 | B2 | 1/2005 | Chauvel |
| 7,634,635 | B1 * | 12/2009 | Holscher et al. ............ 711/220 |

* cited by examiner

*Primary Examiner* — Tuan V. Thai

(57) ABSTRACT

A data structure for enforcing consistent per-physical page cacheability attributes is disclosed. The data structure is used with a method for enforcing consistent per-physical page cacheability attributes, which maintains memory coherency within a processor addressing memory, such as by comparing a desired cacheability attribute of a physical page address in a PTE against an authoritative table that indicates the current cacheability status. This comparison can be made at the time the PTE is inserted into a TLB. When the comparison detects a mismatch between the desired cacheability attribute of the page and the page's current cacheability status, corrective action can be taken to transition the page into the desired cacheability state.

17 Claims, 12 Drawing Sheets

900

```
┌─────────────────────────────────────────────┐
│ REMOVE OLD TLB ENTRIES WITH AFFECTED PHYSICAL│
│                   ADDRESS                    │
│                     901                      │
└─────────────────────────────────────────────┘
                       │
                       ▼
┌─────────────────────────────────────────────┐
│ UPDATE MEMORY CACHABILITY MAP ENTRY CORRESPONDING │
│   TO AFFECTED PHYSICAL PAGE TO 'NON-CACHABLE'│
│                     902                      │
└─────────────────────────────────────────────┘
                       │
                       ▼
┌─────────────────────────────────────────────┐
│        FLUSH CACHE OF AFFECTED PHYSICAL PAGE │
│                     903                      │
└─────────────────────────────────────────────┘
                       │
                       ▼
┌─────────────────────────────────────────────┐
│ CONTINUE EXECUTION: CANDIDATE TLB ENTRY MADE TO TLB │
│   & RESUME INSTRUCTION THAT CAUSED TLB MISS  │
│                     904                      │
└─────────────────────────────────────────────┘
```

```
┌─────────────────────────────────────────────────────┐
│ DRAIN ALL PENDING WRITES TO MEMORY FROM NON-        │
│ CACHABLE PATH ( e.g., WRITE COMBINERS)              │
│ 1001                                                │
└─────────────────────────────────────────────────────┘
                        │
                        ▼
┌─────────────────────────────────────────────────────┐
│ REMOVE OLD TLB ENTRIES WITH AFFECTED PHYSICAL       │
│ ADDRESS                                             │
│ 1002                                                │
└─────────────────────────────────────────────────────┘
                        │
                        ▼
┌─────────────────────────────────────────────────────┐
│ UPDATE MEMORY CACHABILITY MAP ENTRY CORRESPONDING   │
│ TO AFFECTED PHYSICAL PAGE TO 'CACHABLE'             │
│ 1003                                                │
└─────────────────────────────────────────────────────┘
                        │
                        ▼
┌─────────────────────────────────────────────────────┐
│ CONTINUE EXECUTION: CANDIDATE TLB ENTRY MADE TO TLB │
│ & RESUME INSTRUCTION THAT CAUSED TLB MISS           │
│ 1004                                                │
└─────────────────────────────────────────────────────┘
```

FIGURE 10

DATA STRUCTURE FOR ENFORCING CONSISTENT PER-PHYSICAL PAGE CACHEABILITY ATTRIBUTES

RELATED U.S. APPLICATION

This application is a Divisional Patent Application of U.S. patent application Ser. No. 11/314,494 filed on Dec. 20, 2005, which is a Divisional Patent Application of U.S. patent application Ser. No. 10/623,021 filed on Jul. 17, 2003, which are incorporated by reference in their entirety.

TECHNICAL FIELD

Embodiments of the present invention relate to the field of memory management. More specifically, embodiments of the present invention relate to a data structure for enforcing consistent per-physical page cacheability attributes.

BACKGROUND

Embodiments relate to the field of memory management. More specifically, embodiments relate to a data structure for enforcing consistent per-physical page cacheability attributes.

BRIEF DESCRIPTION OF THE DRAWINGS

FIG. 9 is a flowchart of a process for handling a cacheability exception in a cacheable-to-non-cacheable transition, according to one embodiment of the present invention.

FIG. 10 is a flowchart of a process for handling a cacheability exception in a non-cacheable-to-cacheable transition, according to one embodiment of the present invention.

DETAILED DESCRIPTION

A data structure for enforcing consistent per-physical page cacheability attributes is disclosed. Reference will now be made in detail to embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications, and equivalents, which may be included within the spirit and scope of the invention as defined by the appended claims.

Furthermore, in the following detailed description of the present invention, numerous specific details are set forth in order to provide a thorough understanding of the present invention. In other instances, well known components, circuits, methods, materials, and procedures have not been described in detail so as not to unnecessarily obscure aspects of the present invention. Embodiments of the present invention are discussed primarily in the context of a data structure for enforcing consistent per-physical page cacheability attributes.

Modern computer system memory systems typically utilize multiple storage levels, including caching and paging. In paging, physical memory is divided into page frames of a fixed size. A page table (typically residing in main memory), comprising one or more Page Table Entries (PTEs), translates virtual addresses into physical addresses used to access memory. To make the translation process more efficient and thus reduce latency, a translation lookaside buffer (TLB) can be used to cache a subset of the page table.

Figure 1A:
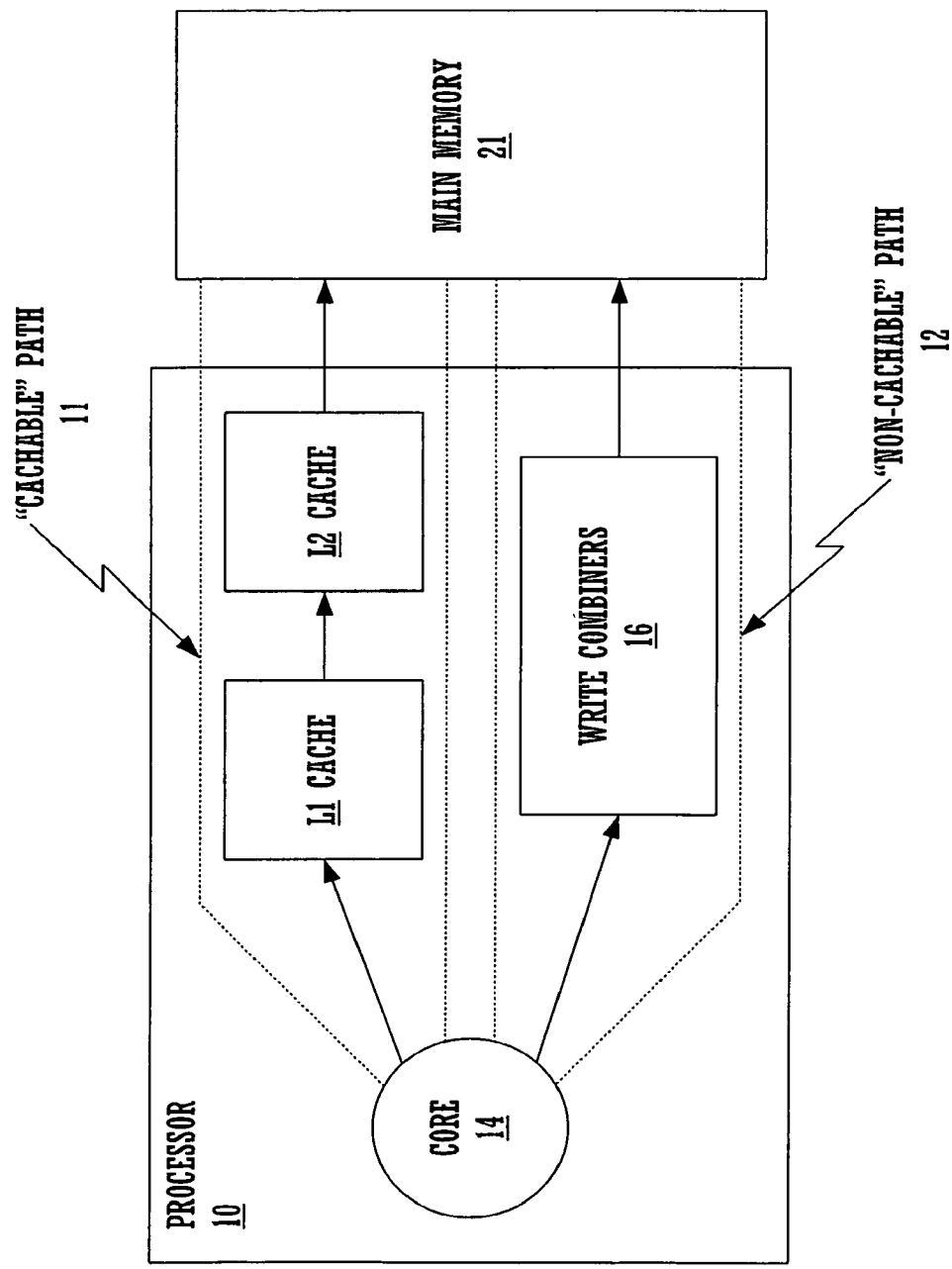
FIG. 1A depicts an exemplary dual path processor access to a memory, according to one embodiment of the present invention.

Some processors access memory via multiple paths. 'X86' processors for instance can employ two separate paths. FIG. 1A depicts an exemplary processor 10. Core 14 can access memory 21 either via cacheable path 11 or non-cacheable path 12. Cacheable path 11 has a first cache L1 and a second cache L2. Non-cacheable path 12 may include write combiners 16.

Figure 1B:
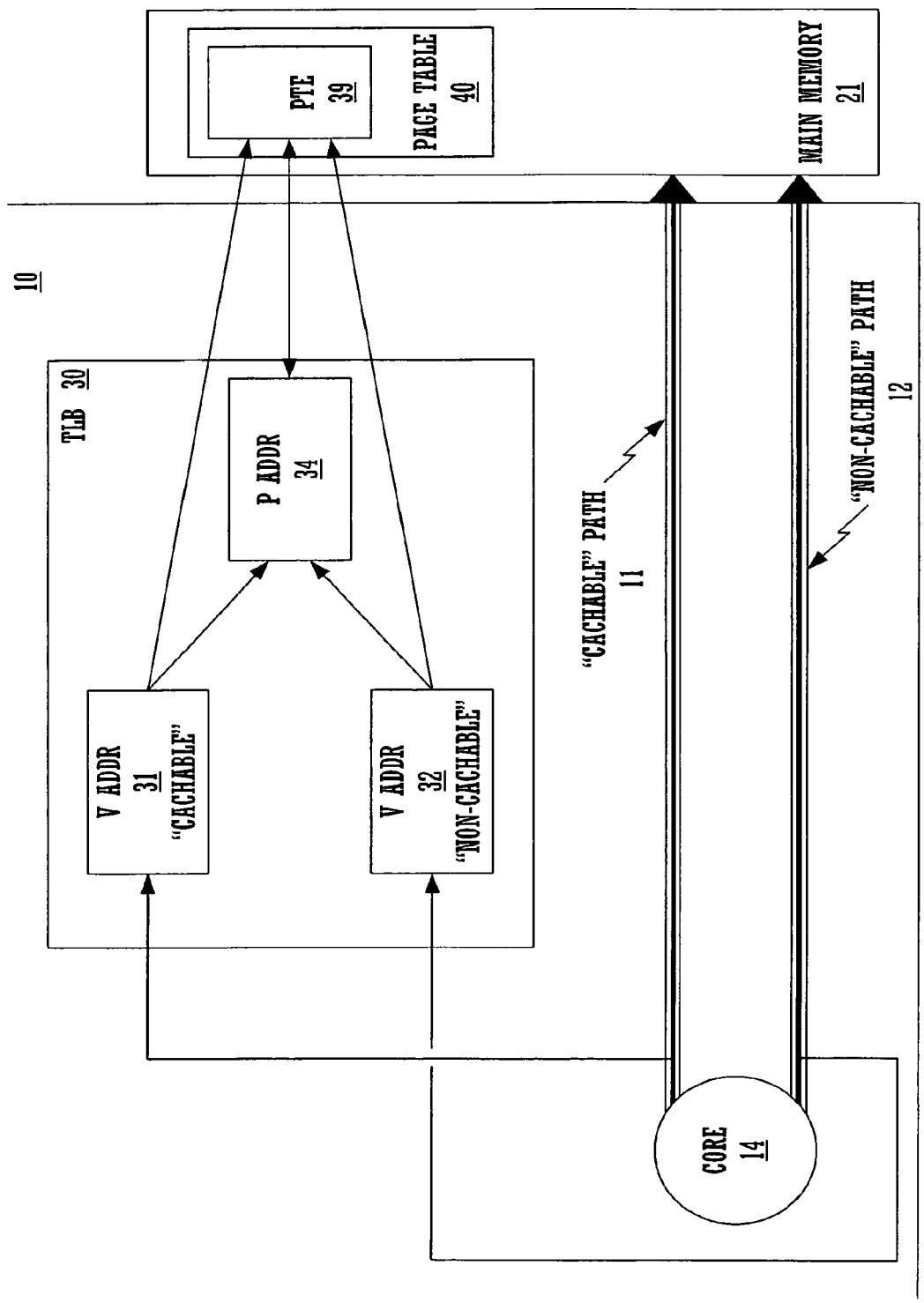
FIG. 1B depicts an exemplary alias collision in a TLB with the dual path processor access to a memory.

Having dual paths between core 14 and memory 21 can introduce cache coherency issues, especially as multiple virtual addresses can map to the same physical address, as depicted in FIG. 1B. Within TLB 30 and PTE 39 of page table 40, an entry corresponding to cacheable path 11 associates the virtual address (VAddr) 31 with physical address (PAddr) 34. However, another PTE corresponding to non-cacheable path 12 associates the VAddr 32 with PAddr 34 in PTE 39 and TLB 30.

Figure 1C:
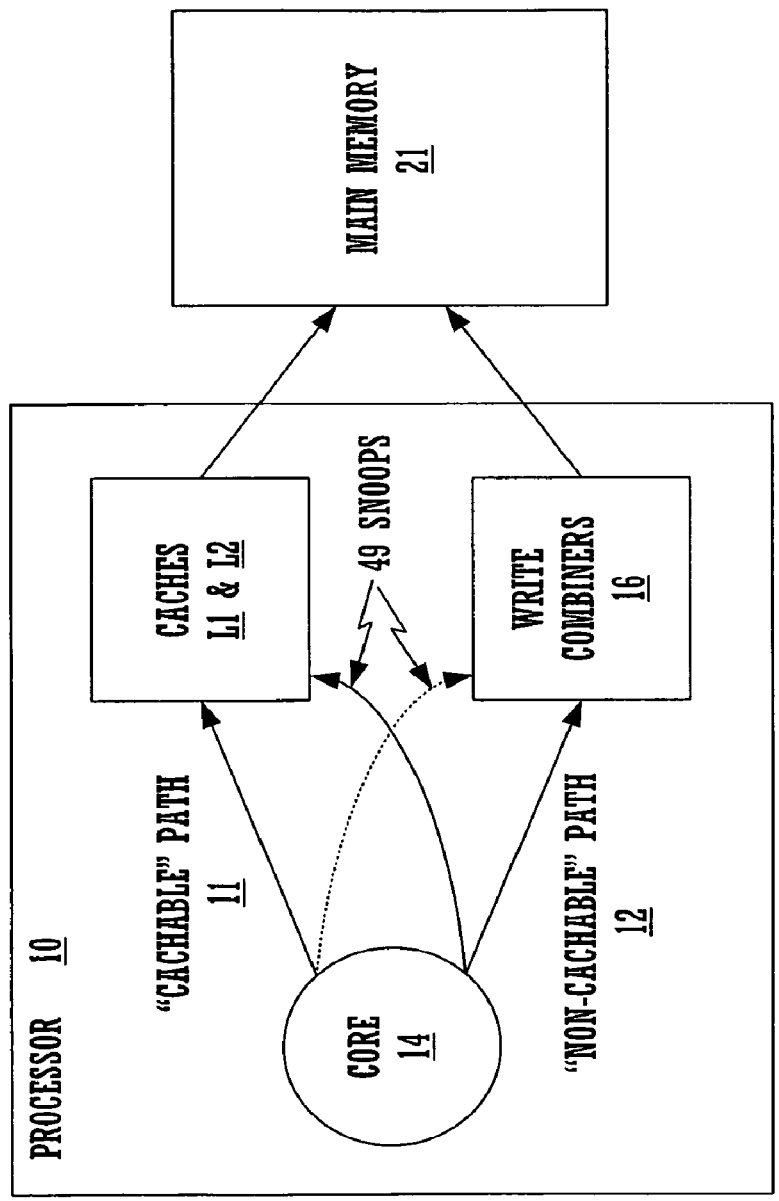
FIG. 1C depicts an exemplary snooping mechanism to maintain cache coherency in a dual path processor access to a memory, according to one embodiment of the present invention.

In the case described above, when the same physical page is accessible via both a cacheable path 11 and a non-cacheable path 12, additional action should be taken to preserve cache coherency and/or memory ordering. In prior art, cache coherency can be maintained by snooping. As depicted in FIG. 1C, when core 14 is accessing via non-cacheable path 12, snoop 49 examines the caches L1 and L2 on a per cache line basis to determine whether a copy is present therein. If a copy is detected in the caches L1 or L2, the data is written back before performing the non-cacheable access, such that the non-cacheable access observes the latest copy of the data from cacheable path 11. Conversely, any pending writes in non-cacheable path 12 (e.g., in write combiners 16) are drained (i.e., written back to main memory) before accessing data through cacheable path 11.

Snoop 49 intertwines cacheable path 11 and non-cacheable path 12. Intertwining can impact hardware resources, because dedicated hardware resources for performing snoops is required or hardware resources occupied by detailing to snoop are unavailable to perform other tasks while snooping.

Further, intertwining the cacheable and non-cacheable paths makes it difficult to independently optimize them for speed.

A processor may operate in an aggressive execution mode wherein it performs speculative memory updates, or a conservative execution mode wherein the processor does not perform speculative memory updates. Speculative updates may be committed at certain points in the execution, or undone by a rollback operation. In one embodiment, speculative memory updates may be stored in the L1 cache. In such processors, it may not in fact be permissible to flush speculative data from the caches. In such a case, snoop 49 is deterred from operating.

Certain portions of the detailed descriptions of embodiments of the invention, which follow, are presented in terms of processes and methods (e.g., processes 600, 700, 800, 900, and 1000 of FIGS. 6, 7, 8, 9, and 10, respectively). Although specific steps are disclosed herein describing the operations of these processes and methods, such steps are exemplary. That is, embodiments of the present invention are well suited to performing various other steps or variations of the steps and/or order of steps recited in the flowcharts of the figures herein.

In one embodiment, such processes are carried out by processors and electrical/electronic components under the control of computer readable and computer executable instructions comprising code contained in a computer usable medium. The computer readable and computer executable instructions reside, for example, in code within a computer usable medium and used in the processor, data storage features, memory, registers and other components of a computer system performing the method for maintaining sufficient bandwidth on a network link during failures. However, the computer readable and computer executable instructions may reside in any type of computer readable medium.

A computer system that embodies a system and performs a method for enforcing consistent per-physical page cacheability attributes can comprise any kind of computer system with sufficient computing power and memory capacity. For example, the computer system can comprise a workstation computer system, an embedded system, a personal computer system, a specialized computing system, a main-frame computer system, or a supercomputer system. Modules of the system for enforcing consistent per-physical page cacheability attributes can be implemented in software, firmware, and/or hardware or any combination of software, firmware, and/or hardware.

A data structure for enforcing consistent per-physical page cacheability attributes is disclosed. In one embodiment, the data structure is used with a method for enforcing consistent per-physical page cacheability attributes, which maintains memory coherency within a processor addressing memory by comparing a desired cacheability attribute of a physical page address in a page translation entry (PTE) against an authoritative table (e.g., physical map) that indicates the current cacheability status. This comparison is made, in one embodiment, at the time the PTE is inserted into a translation lookaside buffer (TLB). In one embodiment, when the comparison detects a mismatch between the desired cacheability attribute of the page and the page's current cacheability status, corrective action can be taken to transition the page into the desired cacheability state. In one embodiment, the corrective action can be performed by either software or hardware.

Therefore, hardware-intensive snooping methods can be dispensed with. The method for enforcing consistent per-physical page cacheability attributes maintains memory coherency within a processor addressing memory without costliness in terms of its impact on existing hardware resources. The method for enforcing consistent per-physical page cacheability attributes also maintains memory coherency within a processor addressing memory that does not require flushing a cache that contains speculative cache lines or waiting for a commit. Further, the method for enforcing consistent per-physical page cacheability attributes implements a cache coherence model within a processor addressing memory that does not rely on snooping and that does not intertwine cacheable and non-cacheable paths.

Exemplary Cacheability Table

Figure 2:
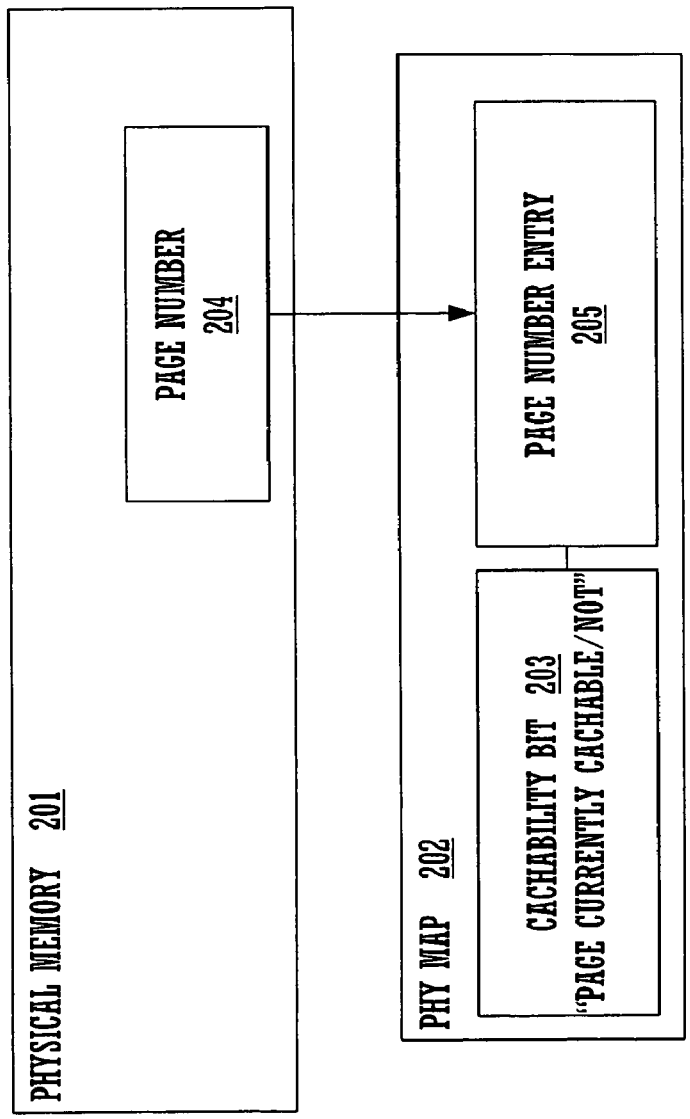
FIG. 2 depicts an exemplary table for indexing physical memory pages and indicating their actual cacheability attribute, according to one embodiment of the present invention.

FIG. 2 depicts an exemplary table for indexing physical memory pages and indicating their actual cacheability attribute, according to one embodiment of the present invention. Physical map 202 maps memory pages of physical memory 201 according to their identity and identifies the pages' respective current cacheability characteristic. The current cacheability characteristic of a page in physical memory 201 corresponds to the route taken to access that page within the physical memory.

A page accessed via a cacheable path (e.g., cacheable path 11; FIG. 1) has a current cacheability characteristic of "cacheable." Having a current cacheability characteristic of cacheable reflects the fact that a memory page is eligible to be cached within a processor. Having a current cacheability characteristic of non-cacheable reflects the fact that a memory page is not cached within the processor and is accessed via a non-cacheable path (e.g., non-cacheable path 12; FIG. 1).

Physical map 202 can comprise a table in a private memory such as a code morphing software memory. Each page within physical memory 201 is indexed by its identifier, which can comprise a page number, within physical map 202. Exemplary page 204 is indexed within physical map by a page number entry 205 corresponding to its page number. Within physical map 202, page number entry 205 is associated with a cacheability bit 203.

Associated with page number entry 205, cacheability bit 203 identifies the current cacheability characteristic of the memory page 204. Cacheability bit 203 indicates that the page was last used in either a cacheable or a non-cacheable way. Thus, cacheability bit 203 states whether the corresponding page in physical memory is currently cacheable or non-cacheable.

Exemplary Tlb Entry Reflective of Desired Cacheability

Figure 3:
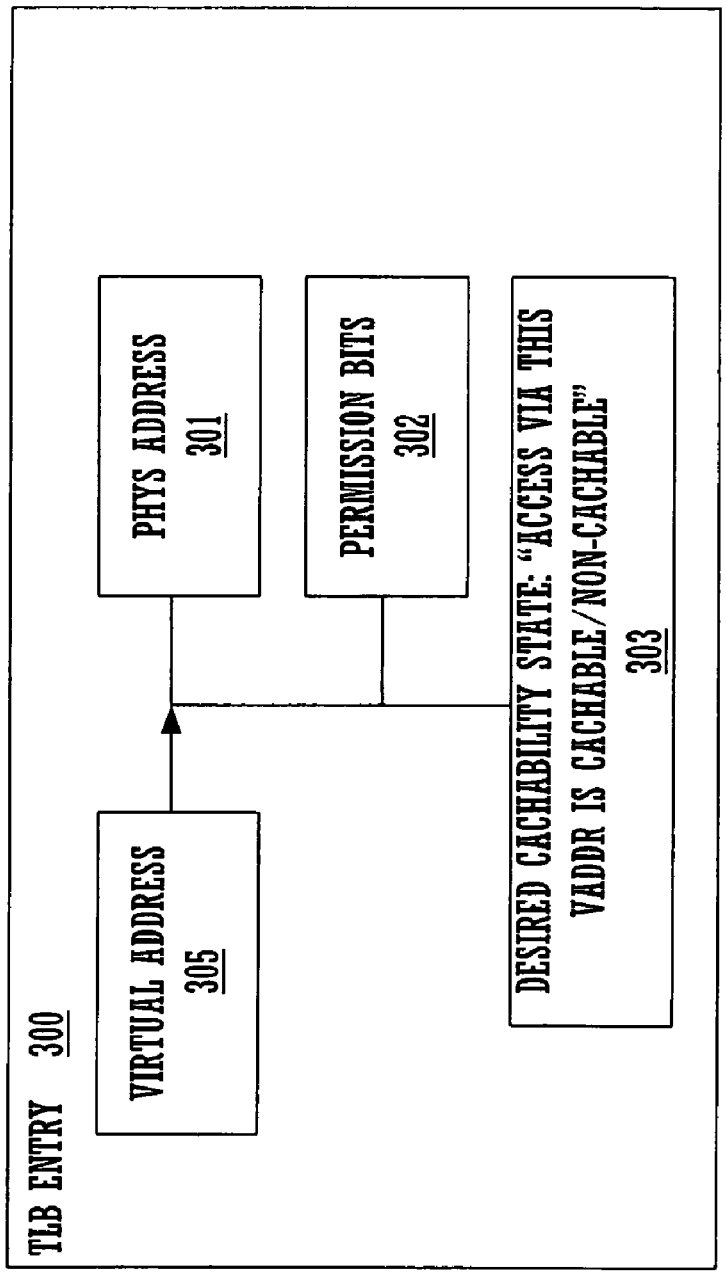
FIG. 3 depicts an exemplary candidate TLB entry with a desired cacheability state component, according to one embodiment of the present invention.

FIG. 3 depicts an exemplary translation lookaside buffer (TLB) entry 300, according to one embodiment of the present invention. TLB entry 300 maps a virtual address 305 to a physical address 301 of a page of physical memory (e.g., page 204; FIG. 2), with any associated permission bits 302. Further, the TLB entry 300 comprises desired cacheability state 303 corresponding to the physical memory page associated with virtual address 305.

Desired cacheability state 303 represents the processor desired path for accessing physical memory. For instance, where a processor will be using data being written during the write, a cacheable path (e.g., cacheable path 11; FIG. 1) is desirable. Thus, the desired cacheability state corresponding to the memory page being written is "cacheable." By contrast, where a processor will not be using data being written during the write, such as when writing graphics data to a GPU a non-cacheable path (e.g., cacheable path 12; FIG. 1) is desirable. Thus, the desired cacheability state corresponding to the memory page being written is "non-cacheable."

Exemplary Consistent Cacheability Characteristics Enforcer

Figure 4:
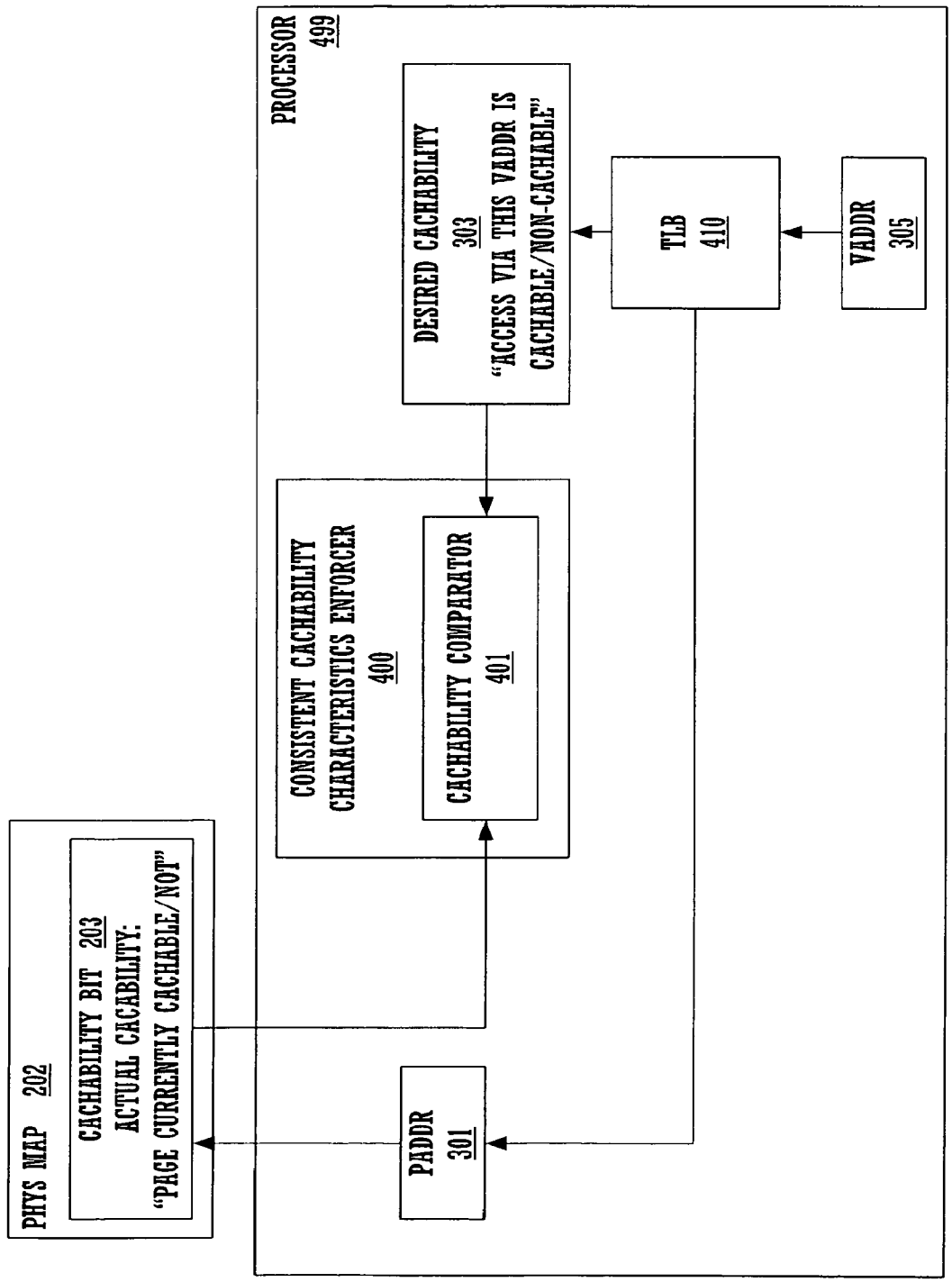
FIG. 4 depicts a system for comparing an actual cacheability characteristic and a desired cacheability state, according to one embodiment of the present invention.

FIG. 4 depicts an exemplary system 400 for enforcing consistent cacheability characteristics, according to one embodiment of the present invention. Consistent cacheability characteristics enforcer 400 comprises a cacheability comparator 401, which operates in one embodiment at TLB insertion time. Before inserting a candidate entry into TLB 410, system 400 obtains cacheability bit 203 from physical map 202. Cacheability comparator 401 compares cacheability bit 203 with desired cacheability state 303, read from the candidate entry to TLB 410. The physical map 202 is indexed using an identifier such as the physical page number of the page as obtained from the TLB 410.

Upon comparing the current cacheability characteristic reflected by cacheability bit 203 with the desired cacheability state 303 of the TLB 410 entry, three results are possible in one embodiment. The desired cacheability state 303 can either match the current cacheability characteristic reflected by cacheability bit 203, i.e., both cacheable or both non-cacheable, or one of two possible mismatches is detected.

The first cacheability mismatch indicates that the current cacheability characteristic reflected by cacheability bit 203 is "cacheable," but that the desired cacheability state 303 is "non-cacheable." This mismatch is indicative that a cacheable-to-non-cacheable transition is to occur in accessing the data associated with the new TLB entry. To enforce memory coherency upon this transition, in one embodiment currently cached copies of the physical page are flushed back to main memory. This flushing can be done upon demand. The candidate entry is then added to the TLB 410 and any old entries that map to the affected physical address are discarded, and the physical map 202 is updated to reflect the non-cacheable mode.

The second cacheability mismatch indicates that the current cacheability characteristic reflected by cacheability bit 203 is "non-cacheable," but the desired cacheability state 303 is "cacheable." This mismatch is indicative that a non-cacheable-to-cacheable transition is to occur in writing the data associated with the new TLB entry, so as to match the processor's cacheability model. In one embodiment, no action is taken. However, in this embodiment, stale data can occur, as outstanding writes may still exist in the non-cacheable path (e.g., write combiners 16; FIG. 1). In another embodiment, the outstanding writes are drained to main memory before continuing. The candidate entry is added to TLB 410 and any old entries that map to the affected physical address are discarded, and the physical map 202 is updated to reflect the cacheable mode.

Exemplary Cacheable to Non-Cacheable Transition

In one embodiment, upon ascertaining that a cacheable-to-non-cacheable transition is to occur, an exception occurs as a result of the mismatch and then it is determined whether the current execution mode is conservative or aggressive. If the execution mode is aggressive, system 400 rolls back to the last commit point and enters conservative mode. The rollback effectively discards all speculative data accumulated to that point. After entry into conservative execution mode, execution is retried, causing System 400 to run forward without speculative updates to memory until the same exception point is reached. At that point, system 400 handles the execution according to the below fix-up operation.

In conservative execution mode, consistent cacheability characteristics enforcer 400 in one embodiment performs a cacheability fix-up operation. The fix-up operation can comprise removing any old entries in TLB 410 to the physical address currently to be accessed, updating physical map 202 such that the cacheability bit 303 reflects "non-cacheable," and flushing the cache (which, on account of executing in conservative mode, contains no speculative data) of the affected physical page. Execution then continues with entering the candidate entry into TLB 410 and eventually resuming the instruction that caused the miss in TLB 410.

Exemplary Cacheable to Non-Cacheable Transition

In one embodiment, upon ascertaining that a non-cacheable-to-cacheable transition is to occur, an exception is called as a result of the mismatch and then it is determined whether the execution mode is conservative or aggressive. If the execution mode is aggressive, system 400 rolls back to the last commit point and enters conservative mode. System 400 then runs forward in conservative mode until the same exception is reached. At that point, system 400 handles the execution according to the below fix-up operation.

In conservative execution mode, consistent cacheability characteristics enforcer 400 in one embodiment performs a cacheability fix-up operation. The fix-up operation can comprise draining to memory all pending writes in the non-cacheable path, for example from write combiners therein (e.g., non-cacheable path 12, write combiners 16; FIG. 1A), removing any old entries in TLB 410 to the physical address currently being accessed, and updating physical map 202 such that the cacheability bit 303 reflects "cacheable." Execution then continues with entering the candidate entry into TLB 410 and eventually resuming the instruction that caused the miss in TLB 410.

Exemplary System

Figure 5:
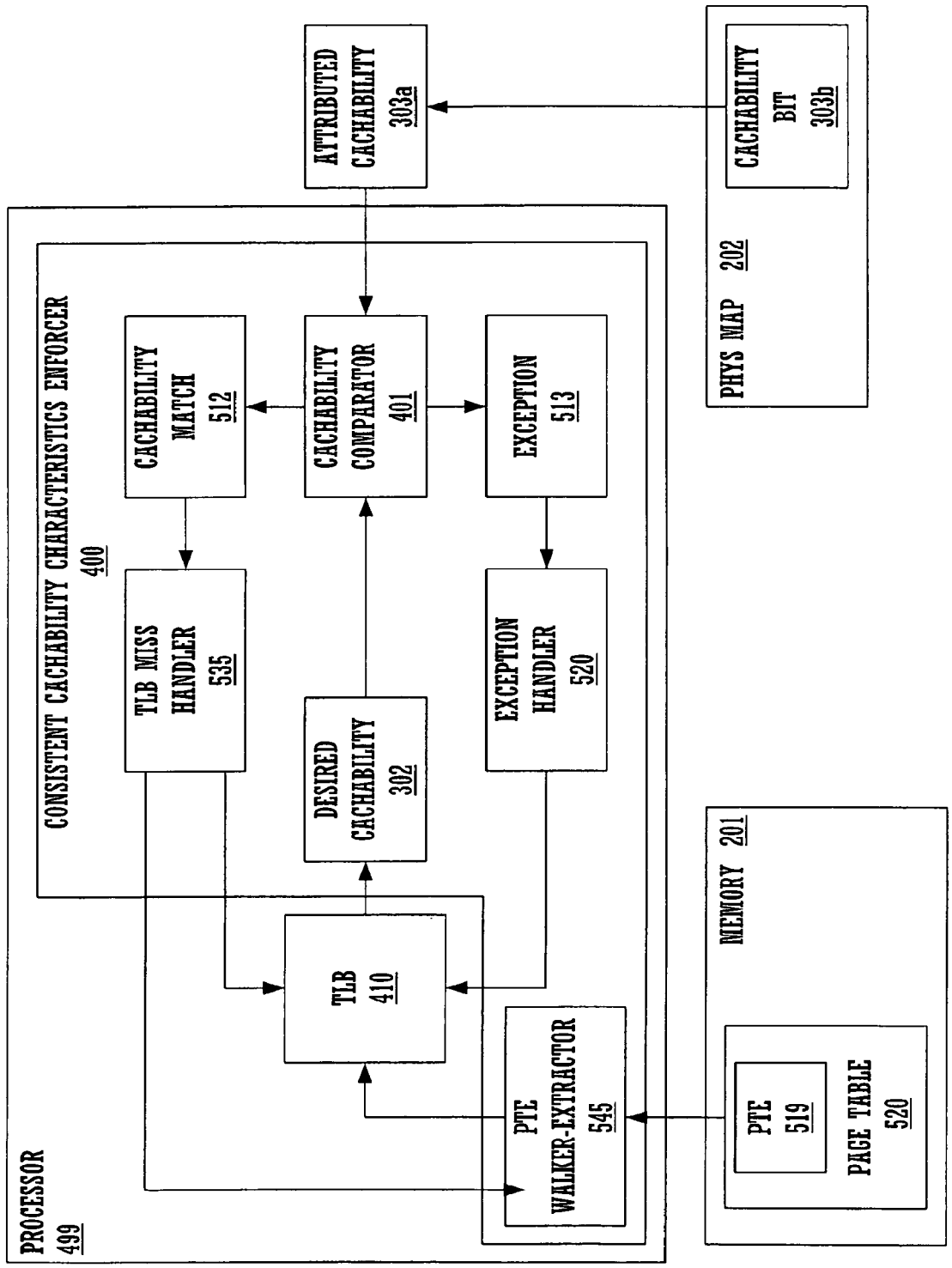
FIG. 5 depicts a system for enforcing consistent cacheability characteristics, according to one embodiment of the present invention.

FIG. 5 depicts a system for enforcing consistent cacheability characteristics, according to one embodiment of the present invention. In one embodiment, the consistent cacheability characteristics enforcer comprises a system 400 that interacts with memory 201 and its physical map 202 to allow the exemplary transitions described above. FIG. 5 depicts system 400 deployed within processor 499. At the time an entry is made into TLB 410 (i.e., TLB insertion time), a physical address within memory 201 corresponding to a virtual address supplied by processor 499 is obtained from page table entry (PTE) 519 within a page table 520. A walker-extractor 545 walks page table 520 and extracts therefrom a PTE 519 corresponding to the physical address.

Walker-extractor 545 provides PTE 519 to TLB 410. TLB 410 provides the desired cacheability state 302 derived or extracted from PTE 519 to cacheability comparator 401. Cacheability comparator 401 ascertains the current attributed cacheability status 303*a* by accessing cacheability bit 303*b* associated with the physical address within physical map 202. Where the desired cacheability 302 matches the current attributed cacheability 303*a*, a cacheability match 512 is reported to TLB miss handler 535. TLB miss handler 535 can then proceed to handle the miss for TLB 410 according to techniques known in the art.

Where it determines that the desired cacheability 302 does not match the actual cacheability 303*a*, cacheability comparator 401 can generate an exception 513. Exception 513 is handled by exception handler 520. Exception handler 520 can, in one embodiment, take no action. In one embodiment, exception handler 520 can operate within processor 499 to handle the exception by causing a cacheable-to-non-cacheable transition or a non-cacheable-to-cacheable transition, as discussed above for instance.

Exemplary Computer Implemented Processes

Figure 6:
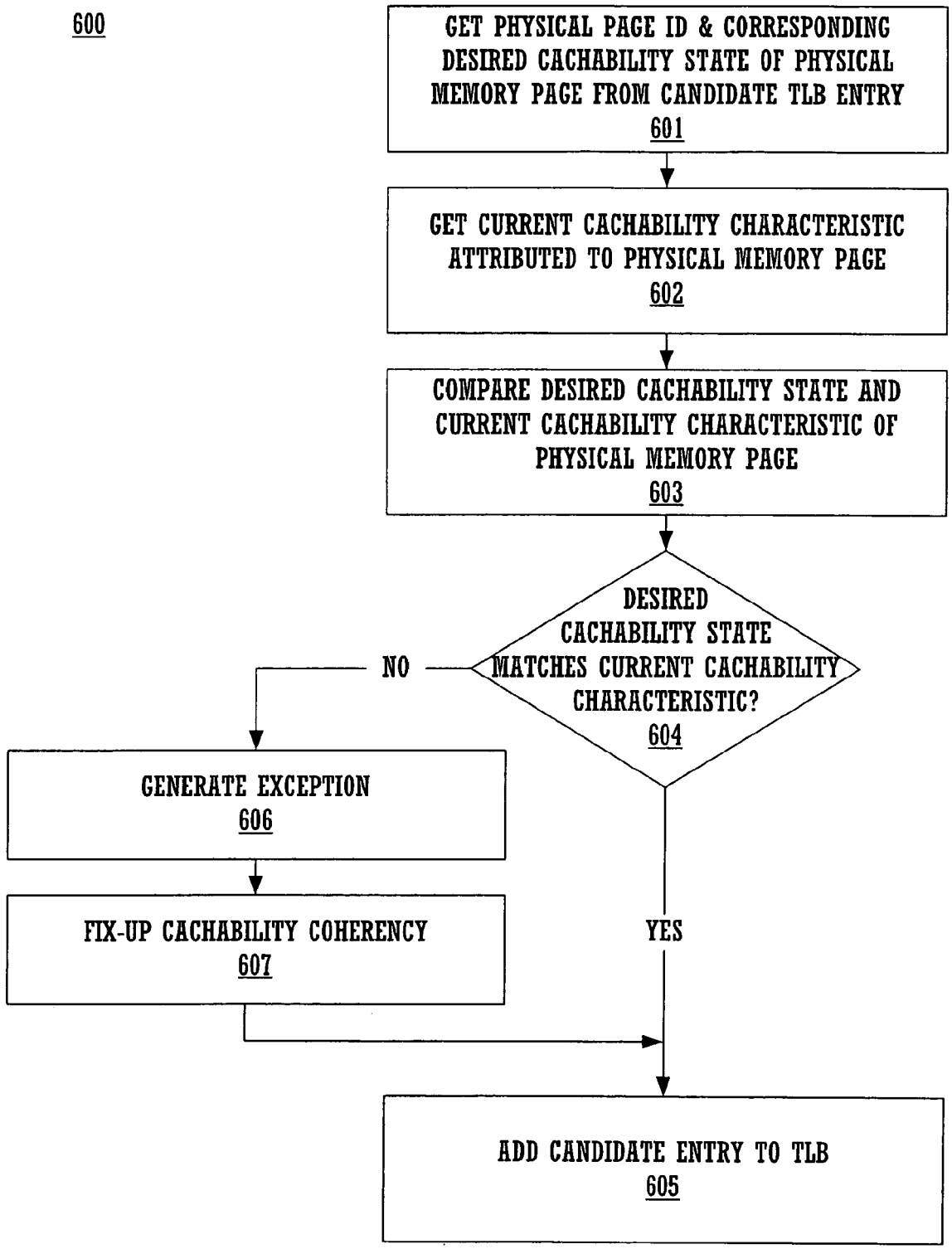
FIG. 6 is a flowchart of a process for comparing the desired cacheability attribute of a page to an actual cacheability status attributed to that page address, according to one embodiment of the present invention.

FIG. 6 is a flowchart of an exemplary computer implemented process for comparing the desired cacheability attribute of a page to an actual cacheability status attributed to that page address at TLB insertion time, according to one embodiment of the present invention. Process 600 can be invoked in response to a candidate TLB entry to be added to the TLB. Process 600 begins with step 601, wherein an identifier of the page of physical memory, such as a page number, and the desired cacheability state thereof is extracted or derived from the candidate TLB entry.

In step 602, the current cacheability characteristic of the physical memory page (of the candidate TLB entry) is retrieved by mapping the physical memory page according to an identifier thereof (e.g., a page number) to an entry in an authoritative table (e.g., physical map 202; FIG. 2). The table lists the page by its identifier along with its current attributed cacheability. The table can be deployed within a private memory.

Figure 8:
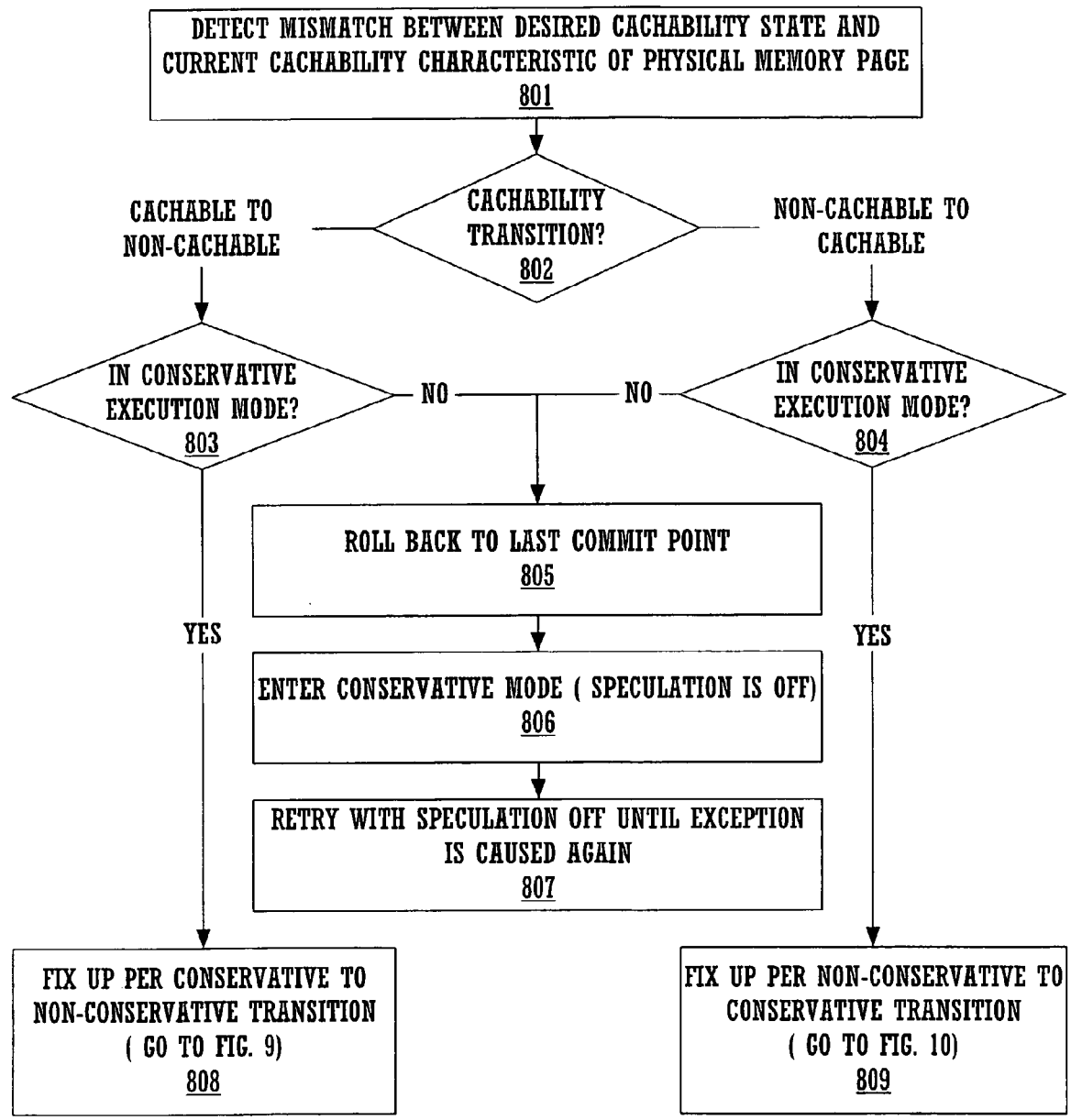
FIG. 8 is a flowchart of a process for determining a cacheability transition direction, according to one embodiment of the present invention.

In step 603, the desired cacheability state and the current cacheability characteristic are compared. In step 604, it is determined whether the desired cacheability state and the current cacheability characteristic match. If the desired cacheability state and the current cacheability characteristic match, then in step 605, the candidate TLB entry is added to the TLB. At this point, TLB exception handling can be performed by techniques known in the art. If the desired cacheability state and the current cacheability characteristic do not match, then in step 606 in one embodiment, an exception is taken. In step 607, cacheability coherency is fixed-up, such as by operations described below (e.g., Processes 800, 900, 1000; FIGS. 8, 9, 10, respectively). Upon fixing-up the cacheability coherency, step 605 is executed, wherein the candidate TLB entry is added to the TLB. Process 600 can be complete upon completion of step 605.

Figure 7:
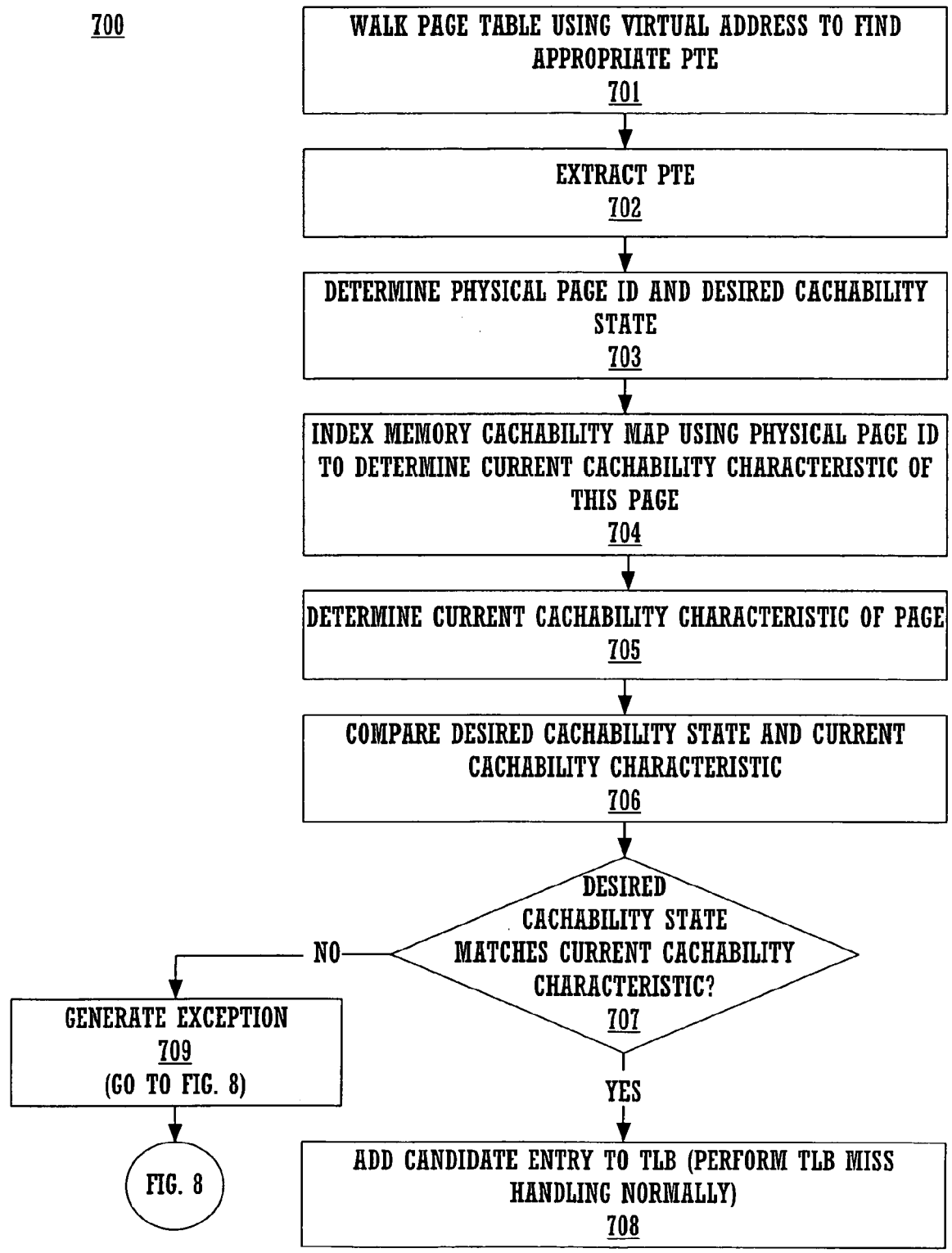
FIG. 7 is a flowchart of a process for accessing desired cacheability states and current cacheability status and comparing them, according to one embodiment of the present invention.

FIG. 7 is a flowchart of an exemplary computer implemented process for accessing desired cacheability states and current cacheability status and comparing them, according to one embodiment of the present invention. Process 700 can be invoked in response to a candidate TLB entry to be added to the TLB. Process 700 begins with step 701 for walking a page table within a physical memory using a virtual address to find a PTE corresponding to a page of the physical memory.

In step 702, the appropriate PTE is extracted and read into a TLB. In step 703, the TLB determines an identifier such as a page number and the desired cacheability state for the page of physical memory represented by that PTE. In step 704, a cacheability map of the pages comprising a physical memory is indexed using the identifier for the page of physical memory. In step 705, the current cacheability characteristic attributed to that page and associated within the cacheability map with that identifier is determined.

In step 706, the desired cacheability state and the current cacheability characteristic are compared. In step 707, it is determined whether the desired cacheability state and the current cacheability characteristic match. If the desired cacheability state and the current cacheability characteristic match, then in step 708, the candidate entry is added to the TLB. Normal TLB miss handling can then performed by techniques known in the art. If the desired cacheability state and the current cacheability characteristic do not match, then in step 709, an exception is generated. Corrective action is taken in one embodiment by an operation as described below (e.g., Process 800; FIG. 8). Process 700 can be complete upon completion of steps 708 or 709.

FIG. 8 is a flowchart of an exemplary computer implemented process 800 for determining a cacheability transition direction, according to one embodiment of the present invention. Process 800 begins with step 801, wherein a mismatch is detected between the desired cacheability state of a candidate for entry into a TLB and the current cacheability characteristic attributed to the corresponding physical memory page. The current cacheability characteristic can be obtained for instance from an authoritative table (e.g., physical map 202; FIG. 2), which maps each page of a physical memory and indexes cacheability characteristics with each page map entry.

In step 802, a desired cacheability transition is determined. For instance, if the mismatch detected is between a desired cacheability state of non-cacheable and a current attributed cacheability characteristic of cacheable, then the desired cacheability transition is from cacheable to non-cacheable. If on the other hand the mismatch detected is between a desired cacheability state of cacheable and a current attributed cacheability characteristic of non-cacheable, then the desired cacheability transition is from non-cacheable to cacheable.

Upon determining that the desired cacheability transition is from cacheable to non-cacheable, then in step 803, it is determined whether the execution mode is conservative or aggressive. Upon determining that the desired cacheability transition is from non-cacheable to cacheable, then in step 804, it is determined whether the execution mode the execution mode is conservative or aggressive.

If it is determined that the execution mode is aggressive, then in step 805, the processor performing process 800 rolls back to the last commit point. This effectively discards all speculative data accumulated to that point. After the rollback, in step 806, the processor enters into conservative execution mode. In step 807, execution is retried until the same exception point is reached.

If it is determined in step 803 that the execution mode is conservative, then in step 808, a cacheability character fix-up is executed appropriate for a cacheable-to-non-cacheable transition (e.g., Process 900; FIG. 9). If it is determined in step 804 that the execution mode is conservative, then in step 809, a cacheability character fix-up is executed appropriate for a non-cacheable-to-cacheable transition (e.g., Process 1000; FIG. 10). Process 800 can be complete upon completing steps 808 or 809.

FIG. 9 is a flowchart of an exemplary computer implemented process 900 for handling a cacheability exception in a cacheable-to-non-cacheable transition, according to one embodiment of the present invention. Process 900 begins with step 901, wherein old TLB entries having the affected physical address to be accessed are removed.

In step 902, a cacheability map (e.g., an authoritative table of cacheability characteristics indexed by page identifier) of the physical memory is updated. The cacheability map entry corresponding to the affected physical memory page is set to "non-cacheable."

In step 903, the cache is flushed of the affected physical page. In step 904, execution continues with entering the candidate TLB entry to the TLB and resuming the instruction that caused the original TLB miss, completing process 900.

FIG. 10 is a flowchart of an exemplary computer implemented process 1000 for handling a cacheability exception in a non-cacheable-to-cacheable transition, according to one embodiment of the present invention. Process 1000 begins with step 1001, wherein all pending writes to the memory from the non-cacheable path (e.g., write combiners 16; FIG. 1A) are drained. In one embodiment, to effectuate a desired weaker memory coherency model, step 1001 can be optional.

In step 1002, old TLB entries having the affected physical address to be accessed are removed. In step 1003, the cacheability map of the physical memory is updated. The cacheability map entry corresponding to the affected physical memory page is set to "cacheable."

In step 1004, execution continues with entering the candidate TLB entry to the TLB and resuming the instruction that caused the original TLB miss, completing process 1000.

In summary, a data structure for enforcing consistent per-physical page cacheability attributes, is disclosed. In one embodiment, the data structure is used with a method for enforcing consistent per-physical page cacheability attributes maintains memory coherency within a processor addressing memory by comparing a desired cacheability attribute of a physical page address in a PTE against an authoritative table that indicates the current cacheability status. This comparison can be made at the time the PTE is inserted into a TLB. In one embodiment, when the comparison detects a mismatch between the desired cacheability attribute of the page and the page's current cacheability status, corrective action can be taken to transition the page into the desired cacheability state.

In one embodiment, the corrective action can be performed by either software or hardware. In one embodiment, the authoritative table resides within a private memory. The table is indexed with an identifier such as a page number, and provides an attributed current cacheability associated with that identifier. In one embodiment, a comparison process checks the page of memory whose cacheability attribute is being determined against the authoritative table and ascertains whether the page's desired cacheability attribute matches the current cacheability state indexed to that page or that a cacheability mismatch exists for that page. In one embodiment, where a cacheability mismatch is detected for a page, the cacheability attribute is modified. This modification in the page's cacheability attribute comprises a corrective action that functions to maintain cache coherency.

An embodiment of the present invention, a data structure for enforcing consistent per-physical page cacheability attributes, is thus described. While the present invention has been described in particular embodiments, it should be appreciated that the present invention should not be construed as limited by such embodiments, but rather construed according to the following claims and their equivalents.

What is claimed is:

1. A method comprising:
   obtaining a first cacheability bit from a candidate entry that maps to a first physical page;
   obtaining a second cacheability bit of said first physical page from a table that associates a physical page identifier with a current cacheability characteristic for physical pages;
   comparing said first cacheability bit and said second cacheability bit;
   responsive to a mismatch in said comparing, generating an exception and performing a fix-up operation, wherein said fix-up operation conforms said second cacheability bit with said first cacheability bit; and
   entering said candidate entry into a translation lookaside buffer.

2. The method of claim 1, wherein said first and said second cacheability bits comprise components of a data structure which is disposed in a memory and which provides information corresponding to the current cacheability characteristic of physical pages of said memory, wherein said data structure comprises a data field for identifying said current cacheability characteristic, wherein said data structure is indexed by said physical page identifier, and wherein said physical page identifier comprises a physical page number.

3. The method of claim 1, wherein said first cacheability bit indicates cacheable and said second cacheability bit indicates non-cacheable and wherein said performing a fix-up operation comprises:
   updating said current cacheability characteristic to non-cacheable; and
   flushing a cache of said physical page.

4. The method of claim 1, wherein said first cacheability bit indicates non-cacheable and said second cacheability bit indicates cacheable and wherein said performing a fix-up operation comprises:
   draining a pending write from a non-cacheable path; and
   updating said current cacheability characteristic to cacheable.

5. The method of claim 1, wherein said performing a fix-up operation comprises:
   determining that a mode of execution is aggressive;
   rolling back to the last commit point in said execution;
   changing said mode of execution to disallow speculation; and
   repeating said execution without speculation until said exception is triggered again.

6. The method of claim 5, wherein said first cacheability bit indicates cacheable and said second cacheability bit indicates non-cacheable and wherein said performing a fix-up operation comprises:
   updating said current cacheability characteristic to non-cacheable; and
   flushing a cache of said physical page.

7. The method of claim 5, wherein said first cacheability bit indicates non-cacheable and said second cacheability bit indicates cacheable and wherein said performing a fix-up operation comprises:
   draining a pending write from a non-cacheable path; and
   updating said current cacheability characteristic to cacheable.

8. The method of claim 1 further comprising removing an old entry with said physical page identifier from said translation lookaside buffer.

9. A method comprising:
   obtaining a first cacheability attribute from a candidate entry that maps to a first physical page;
   obtaining a second cacheability attribute of said first physical page from a table that associates a physical page identifier with a current cacheability characteristic for physical pages;
   comparing said first cacheability attribute and said second cacheability attribute;
   responsive to a mismatch in said comparing, generating an exception and performing a fix-up operation, wherein said fix-up operation conforms said second cacheability attribute with said first cacheability attribute; and
   entering said candidate entry into a translation lookaside buffer.

10. The method of claim 9, wherein said first and said second cacheability attributes comprise components of a data structure which is disposed in a memory and which provides information corresponding to the current cacheability characteristic of physical pages of said memory, wherein said data structure comprises a data field for identifying said current cacheability characteristic, and wherein said data structure is indexed by said physical page identifier.

11. The method of claim 10, wherein said physical page identifier comprises a physical page number.

12. The method of claim 10, wherein said first cacheability attribute indicates cacheable and said second cacheability attribute indicates non-cacheable and wherein said performing a fix-up operation comprises:
   updating said current cacheability characteristic to non-cacheable; and
   flushing a cache of said physical page.

13. The method of claim 10, wherein said first cacheability attribute indicates non-cacheable and said second cacheability attribute indicates cacheable and wherein said performing a fix-up operation comprises:
   draining a pending write from a non-cacheable path; and
   updating said current cacheability characteristic to cacheable.

14. The method of claim 10, wherein said performing a fix-up operation comprises:
   determining that a mode of execution is aggressive;
   rolling back to the last commit point in said execution;
   changing said mode of execution to disallow speculation; and
   repeating said execution without speculation until said exception is triggered again.

15. The method of claim 14, wherein said first cacheability attribute indicates cacheable and said second cacheability attribute indicates non-cacheable and wherein said performing a fix-up operation comprises:
   updating said current cacheability characteristic to non-cacheable; and
   flushing a cache of said physical page.

16. The method of claim 14, wherein said first cacheability attribute indicates non-cacheable and said second cacheability attribute indicates cacheable and wherein said performing a fix-up operation comprises:
   draining a pending write from a non-cacheable path; and
   updating said current cacheability characteristic to cacheable.

17. The method of claim 9 further comprising removing an old entry with said physical page identifier from said translation lookaside buffer.

* * * * *